United States Patent [19]
Walker et al.

[11] Patent Number: 5,463,403
[45] Date of Patent: Oct. 31, 1995

[54] AUTOMATIC ADJUSTMENT OF RECEIVER APPARATUS BASED ON CHANNEL-BIT-ERROR-RATE-AFFECTED PARAMETER MEASUREMENT

[75] Inventors: Gordon K. Walker, Escondido; Paul Moroney, Olivenhain, both of Calif.

[73] Assignee: General Instrument Corporation, Chicago, Ill.

[21] Appl. No.: 180,574

[22] Filed: Jan. 12, 1994

Related U.S. Application Data

[63] Continuation of Ser. No. 911,980, Jul. 10, 1992, Pat. No. 5,287,115.
[51] Int. Cl.$^6$ ....................................................... H01Q 3/00
[52] U.S. Cl. ................................................................ 342/359
[58] Field of Search .............................................. 342/359

[56] References Cited

U.S. PATENT DOCUMENTS

| | | | |
|---|---|---|---|
| 4,744,083 | 5/1988 | O'Neill et al. | 371/22 |
| 4,796,032 | 1/1989 | Sakura et al. | 342/359 |
| 5,175,558 | 12/1992 | Dupree | 342/378 |
| 5,287,115 | 2/1994 | Walker et al. | 342/359 |

FOREIGN PATENT DOCUMENTS

| | | |
|---|---|---|
| 3723114 | 1/1989 | Germany. |
| 2237686 | 5/1991 | United Kingdom. |
| 9003667 | 4/1990 | WIPO. |

OTHER PUBLICATIONS

Morikura et al., "Novel Channel Control Quality Improvement in Satellite Communication Systems Employing High Coding Gain FEC", IEEE Global Telecommunications Conference & Exhibition, Hollywood, Fla., Nov. 28–Dec. 1, 1988, pp. 136–140.
Patent Abstracts of Japan, vol. 14, No. 85, 16 Feb. 1990, JP1296746 (Sony Corp.).
Viterbi and Omura, "Principles of Digital Communication and Coding," McGraw–Hill, Inc., 1979 pp. 258–261.

*Primary Examiner*—Theodore M. Blum
*Attorney, Agent, or Firm*—Edward W. Callan

[57] ABSTRACT

Alignment of an antenna and a polarizer for the antenna are automatically adjusted and the frequency setting of a frequency-tunable receiver is automatically adjusted while receiving a broadcast communication signal that is forward-error-correction coded by processing the forward-error-correction code of the received signal to measure a channel-bit-error-rate-affected parameter for the received signal; by realigning the antenna and the polarizer from their respective initial positions in response to the measured parameter until the measured parameter is minimized; and by retuning the receiver from its initial frequency setting in response to the measured parameter until the measured parameter is minimized. A Viterbi decoder processes the forward-error-correction code of the received signal to compute path metrics affected by the bit-error rate of the received signal and normalizes the computed path metrics; and a counter counts the normalizations over fixed intervals to measure a path metric normalization rate as the measured parameter.

24 Claims, 1 Drawing Sheet

AUTOMATIC ADJUSTMENT OF RECEIVER APPARATUS BASED ON CHANNEL-BIT-ERROR-RATE-AFFECTED PARAMETER MEASUREMENT

This is a continuation of application Ser. No. 07/911,890 filed Jul. 10, 1992, now U.S. Pat. No. 5,287,115, issued Feb. 15, 1994.

BACKGROUND OF THE INVENTION

The present invention generally pertains to broadcast signal receiving system and is particularly directed to a system for automatically adjusting an apparatus for receiving a broadcast communication signal while the broadcast signal is being received. Such receiving apparatus include apparatus that may be adjusted to effect reception of a broadcast communication signal, such as an antenna. an antenna polarizer and a frequency-tunable receiver.

Typically, an antenna is attached to an antenna mount by an actuator and is rotated about a given axis on the antenna mount by moving the actuator in order to align the antenna with a given signal source, such as a communication satellite in geosynchronous orbit above the Earth's equator.

Once the antenna is aligned with the given signal source, it may also be necessary to align the polarizer of the antenna so that a linear polarization axis of the antenna matches a linear polarization axis of a communication channel being received from the signal source. Alignment of the polarizer is required when the signal source is a communication satellite, since odd and even numbered channels received from communication satellites are skewed ninety degrees with respect to each other in order to avoid interference between adjacent channels. One type of polarizer is aligned by rotating a feed probe within the polarizer.

The antenna and the polarizer are respectively realigned from their present positions in response to control signals provided by an antenna controller.

A typical frequency-tunable receiver is tuned to provide the received signal at a given intermediate frequency setting by adjusting the frequency of a local oscillator signal in response to operation of a control device to select a broadcast channel so that when the local oscillator signal is mixed with a received broadcast communication signal that is at the carrier frequency of the selected channel, the received signal is provided at the given intermediate frequency.

When one desires to change the received communication channel, the receiver is tuned to the carrier frequency of a newly selected broadcast channel, and an identification of the newly selected channel is provided to the antenna controller, which automatically effects a coarse realignment of the antenna and/or the polarizer, when the new channel is received from a different signal source and/or has a different linear polarization axis than the last previously received broadcast signal. Such realignment is effected in accordance with information stored in a data memory of the controller indicating certain alignment parameters of each of a plurality of channels.

In some prior art antenna controllers, fine alignment of the antenna and the polarizer are automatically achieved once the communication signal is being received following coarse realignment. Such fine alignment is achieved by measuring the amplitude of the received signal and realigning the antenna and/or the polarizer from an initial position until the measured signal amplitude is maximized. However, when interference and/or noise also are received over the communication channel, optimum signal reception is not always achieved at the maximum measured signal amplitude.

In some receivers, fine tuning to a given intermediate frequency is automatically achieved by a feedback technique, such as a frequency-locked loop. However, when interference and/or noise also are received over the communication channel, optimum signal reception is not always achieved at precisely such an automatically fine-tuned frequency.

These are particular problems with video signal reception, since differences in the quality of video reception are readily perceived by viewers.

SUMMARY OF THE INVENTION

The present invention provides an improved method an system for automatically adjusting an apparatus for receiving a broadcast communication signal that is forward-error-correction coded.

In one aspect, the present invention provides a method of automatically adjusting an apparatus for receiving a broadcast communication signal that is forward-error-correction coded, comprising the steps of: (a) processing a received forward-error-correction-coded signal, when the received signal has been forward error corrected with a convolutional code, to measure a channel-bit-error-rate-affected parameter for the received signal; and (b) adjusting the apparatus from an initial setting in response to said measurement until the measured parameter is minimized; wherein step (a) comprises the steps of: (c) processing the forward-error-correction code he received signal with a Viterbi decoder to compute path metrics affected by the bit-error rate of the received signal and to normalize said computed path metrics, and (d) counting said normalizations over fixed intervals to measure a path metric normalization rate as the measured parameter.

In another aspect, the present invention provide a method of automatically adjusting an apparatus for receiving a broadcast communication signal that is forward-error-correction coded, comprising the steps of: (a) processing a received forward-error-correction-coded signal, when the received signal has been forward error corrected with a convolutional code, to measure a channel-bit-error-rate-affected parameter for the received signal; and (b) adjusting the apparatus from an initial setting in response to said measurement until the measured parameter is minimized; wherein step (b) comprises the steps of: (c) readjusting the apparatus within a given range of settings defined by boundaries on both sides of the initial setting; (d) extending said given range beyond one of said boundaries when the measured parameter is minimized at said one boundary; and (e) readjusting said apparatus within said extended given range.

By adjusting such receiving apparatus as an antenna, an antenna polarizer and/or a frequency-tunable receiver to minimize the measured parameter the quality of signal reception is optimized in the presence of interference and noise.

Additional features of the present invention are described in relation to the description of the preferred embodiment.

BRIEF DESCRIPTION OF THE DRAWING

FIG. 2 is a diagram of a combination of processing elements implemented by the processor in the system of

FIG. 1.

DESCRIPTION OF THE PREFERRED EMBODIMENT

Figure 1:
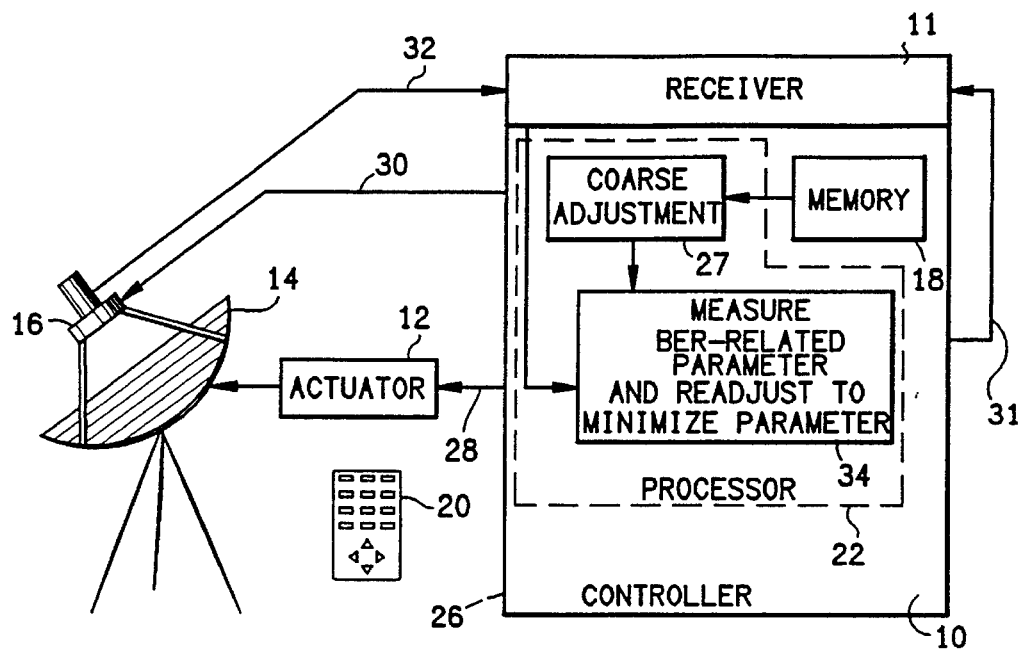
FIG. 1 is block diagram of the system of the present invention in combination with an antenna.

Referring to FIG. 1, in a preferred embodiment of the present invention, a controller 10 is coupled to a frequency-tunable communication signal receiver 11, an actuator 12 for an antenna 14 and to a mechanical polarizer 16 for the antenna 14. The controller 10 includes a memory 18, a keypad 20 and a processor 22. The controller 10 and the communication signal receiver 11 are housed in a common chassis 26, except that the controller keypad 20 is contained in a remote control unit. The memory 18 stores antenna alignment parameters, polarizer alignment parameters and frequency-setting data for each of a plurality of predetermined communication channels. The receiver 11 is tuned by adjusting the frequency of a local oscillator signal that is mixed with a received signal at the carrier frequency of the selected channel to provide the received signal at a given intermediate frequency.

When a different receiver channel is selected by operation of the keypad 20, the processor 22 executes a coarse-adjustment processing routine 27 that causes the controller 10 to effect a coarse alignment of the antenna 14 and the polarizer 16 in accordance with the alignment parameters stored in the memory 18 for the selected channel by providing control signals on line 28 to the actuator 12 and on line 30 to the polarizer 160 and also causes the controller 10 to tune the receiver 11 to an initial frequency setting in accordance with frequency-setting data stored in the memory 18 for the selected channel by providing a control signal on line 31 to the receiver 11.

The receiver 11 is tuned to provide the received signal at a given intermediate frequency setting by adjusting the frequency of the local oscillator signal in response to the control signal on line 31 so that when the local oscillator signal is mixed with a received broadcast communication signal that is at the carrier frequency of the selected channel, the received signal is provided at the given intermediate frequency.

Once a signal that has been forward-error-correction coded is received by the receiver 11 on line 32 from the polarizer 16, the processor 22 executes a measurement-and-readjustment processing routine 34 of processing the received signal to measure the channel-bit-error-rate-affected parameter of the received signal and causes the controller 10 to provide control signals on line 28 to the actuator 12, on line 30 to the polarizer 16 and on line 31 to the receiver 11 to realign the antenna 14 and the polarizer 16 and to retune the receiver 11 until the measured bit-error-rate-affected parameter is minimized. Preferably, the measurement-and-readjustment routine 34 is executed sequentially for the antenna 14, the polarizer 16 and the receiver 11, rather than simultaneously.

Figure 2:
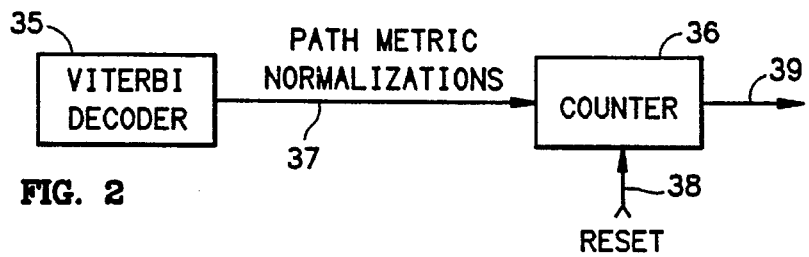

In embodiments of the invention designed for use with systems that receive communication signals that are forward error corrected with a convolutional code, the processor 22 in the system of FIG. 1 includes a Viterbi decoder 35 and a counter 36, as shown in FIG. 2.

The Viterbi decoder 35 processes the forward-error-correction code symbols of the received signal to compute path metrics affected by to the bit-error rate of the received signal and normalizes the computed path metrics. The counter 36 counts the normalizations 37 by the Viterbi decoder 35 over fixed intervals defined by a periodic reset signal 38 to provide a measurement 39 of the path metric normalization rate as the measured channel-bit-error-rate-affected parameter for the received signal. The counter 36 responds to each reset signal 38 by providing the accumulated count of norrealizations and resetting the count to zero. Utilization of the path metric normalization rate as the measured channel-bit-error-rate-affected parameter rapidly provides accurate measurements over a wide range of C/N values for enabling rapid accurate automatic alignment of the antenna 14.

Figure 3:
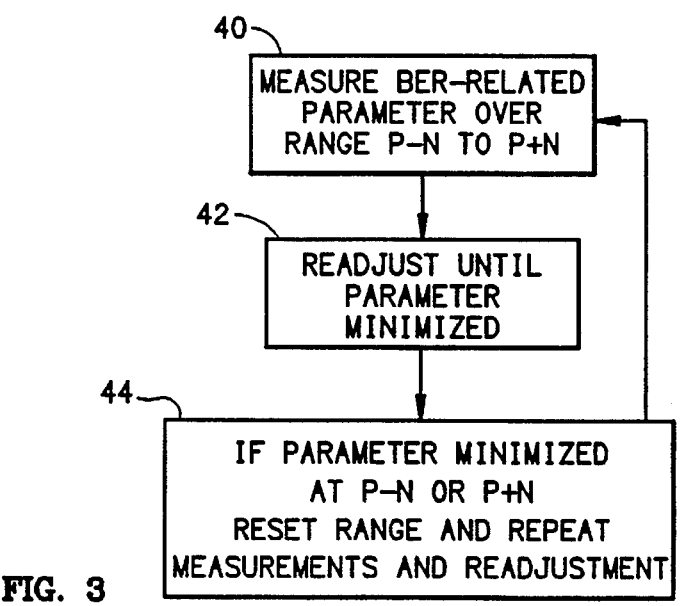
FIG. 3 is a diagram of a processing routine executed by the processor in the system of FIG. 1.

The measurement-and-readjustment processing routine 34 includes a series of steps 40, 42 and 44, as shown in FIG. 3.

When the processing routine 34 is performed to readjust the alignment of the antenna 14 or the polarizer 16, in the first step 40, the channel-bit-error-rate-affected parameter for the received signal is measured at each of a plurality of positions of the antenna 14 and the polarizer 16 extending to N positions on both sides of the respective initial position P of the antenna 14 or the polarizer 16 when the processing routine 34 begins. The measurement range extends from a position P−N on one side of the position P to a position P+N on the other side of the position P.

In the second step 42 of readjusting the alignment of the antenna 14 or the polarizer 16, the controller 10 realigns the antenna 14 or the polarizer 16 until the measured parameter is minimized. The measurement step 40 and the readjustment step 42 are repeated for each position within the measurement range, with the antenna 14 or the polarizer 16 being realigned after each measurement of the channel-bit-error-rate-affected parameter. Once it is determined at which position the measured parameter is minimized, realignment of the antenna 14 or the polarizer 16 ceases when the antenna 14 or the polarizer 16 is realigned to its minimized-measured-parameter position.

In the third step 44 of readjusting the alignment of the antenna 14 or the polarizer 16, it is determined whether the position within the measurement range at which the measured parameter is minimized by realignment is at a boundary of the measurement range, P+N or P−N. If so, the measurement steps 40 and the readjustment steps 42 are repeated for a new measurement range extending N positions on both sides of the boundary position of the previous measurement range at which the minimum value of the channel-bit-error-rate-affected parameter was measured.

When the processing routine 34 is performed to readjust the tuning of the receiver 11, in the first step 40, the channel-bit-error-rate-affected parameter for the received signal is measured at each of a plurality of frequency settings of the receiver 11, extending to N frequency settings on both sides of the initial frequency setting when the processing routine 34 begins. The measurement range extends from a setting P−N on one side of the setting P to a setting P+N on the other side of the setting P.

In the second step 42 of readjusting the tuning of the receiver 11, the controller 10 retunes the receiver 11 in response to the control signal on line 31 by adjusting the frequency of the local oscillator signal to thereby change the intermediate frequency of the receiver 11 until the measured parameter is minimized. The measurement step 40 and the readjustment step 42 are repeated for each setting within the measurement range, with the receiver 11 being retuned after each measurement of the channel-bit-error-rate-affected parameter. Once it is determined at which frequency setting the measured parameter is minimized, retuning of the receiver 11 ceases when the receiver 11 is retuned to its minimized-measured-parameter frequency setting.

In the third step 44 of readjusting the tuning of the receiver 11, it is determined whether the frequency setting within the measurement range at which the measured parameter is minimized by retuning is at a boundary of the measurement range, P+N or P−N. If so, the measurement steps 40 and the readjustment steps 42 are repeated for a new measurement range extending N settings on both sides of the boundary of the previous measurement range at which the minimum value of the channel-bit-error-rate-affected parameter was measured.

Although the adjustment system of the present invention is particularly useful when receiving digital video signals with a satellite communication system. it also is useful with other types of digital communications system for receiving other types of digital communication signals.

We claim:

1. A system for automatically adjusting an apparatus for receiving a broadcast communication signal that is forward-error-correction coded, comprising means for processing a received forward-error-correction-coded signal to measure a channel-bit-error-rate-affected parameter for the received signal; and means for adjusting the apparatus from an initial setting in response to said measurement until the measured parameter is minimized;

wherein the adjusting means are adapted for readjusting the apparatus within a given range of settings defined by boundaries on both sides of the initial setting, for extending said given range beyond one of said boundaries when the measured parameter is minimized at said one boundary and for readjusting said apparatus within said extended given range; and wherein the processing means includes a Viterbi decoder for processing the forward-error-correction code of the received signal when the received signal has been forward error corrected with a convolutional code, to compute path metrics affected by the bit-error rate of the received signal and for normalizing said computed path metrics, and means for counting said normalizations over fixed intervals to measure a path metric normalization rate as the measured parameter.

2. A system for automatically adjusting an antenna for receiving a broadcast communication signal that is forward-error-correction coded, comprising means for processing a received forward-error-correction-coded signal to measure a channel-bit-error-rate-affected parameter for the received signal; and means for adjusting the antenna from an initial setting in response to said measurement until the measured parameter is minimized;

wherein the processing means includes a Viterbi decoder for processing the forward-error-correction code of the received signal when the received signal has been forward error corrected with a convolutional code, to compute path metrics affected by the bit-error rate of the received signal and for normalizing said computed path metrics, and means for counting said normalizations over fixed intervals to measure a path metric normalization rate as the measured parameter; and wherein the adjusting means are responsive to said measurement for realigning the antenna from an initial position until the measured parameter is minimized.

3. A system according to claim 2, wherein the adjusting means are adapted for realigning the antenna within a given range of positions defined by boundaries on both sides of the initial position, for extending said given range beyond one of said boundaries when the measured parameter is minimized at said one boundary and for realigning said antenna within said extended given range.

4. A system for automatically adjusting an antenna polarizer for receiving a broadcast communication signal that is forward-error-correction coded, comprising means for processing a received forward-error-correction-coded signal to measure a channel-bit-error-rate-affected parameter for the received signal; and means for adjusting the polarizer from an initial setting in response to said measurement until the measured parameter is minimized;

wherein the processing means includes a Viterbi decoder for processing the forward-error-correction code of the received signal when the received signal has been forward error corrected with a convolutional code, to compute path metrics affected by the bit-error rate of the received signal and for normalizing said computed path metrics, and means for counting said normalizations over fixed intervals to measure a path metric normalization rate as the measured parameter; and wherein the adjusting means are responsive to said measurement for realigning the polarizer from an initial position until the measured parameter is minimized.

5. A system according to claim 4, wherein the adjusting means are adapted for realigning the polarizer within a given range of positions defined by boundaries on both sides of the initial position, for extending said given range beyond one of said boundaries when the measured parameter is minimized at said one boundary and for realigning said polarizer within said extended given range.

6. A system for automatically adjusting a frequency-tunable receiver for receiving a broadcast communication signal that is forward-error-correction coded, comprising means for processing a received forward-error-correction-coded signal to measure a channel-bit-error-rate-affected parameter for the received signal; and means for adjusting the receiver from an initial setting in response to said measurement until the measured parameter is minimized;

wherein the processing means includes a Viterbi decoder for processing the forward-error-correction code of the received signal when the received signal has been forward error corrected with a convolutional code, to compute path metrics affected by the bit-error rate of the received signal and for normalizing said computed path metrics, and means for counting said normalizations over fixed intervals to measure a path metric normalization rate as the measured parameter; and wherein the adjusting means are responsive to said measurement for retuning the receiver from an initial frequency setting until the measured parameter is minimized.

7. A system according to claim 6, wherein the adjusting means are adapted for retuning the receiver within a given range of frequency settings defined by boundaries on both sides of the initial setting, for extending said given range beyond one of said boundaries when the measured parameter is minimized at said one boundary and for retuning said 8. A method of automatically adjusting an apparatus for receiving a broadcast communication signal that is forward-error-correction coded, comprising the steps of:

(a) processing a received forward-error-correction-coded signal, when the received signal has been forward error corrected with a convolutional code, to measure a channel-bit-error-rate-affected parameter for the received signal; and (b) adjusting the apparatus from an initial setting in response to said measurement until the measured parameter is minimized;

wherein step (a) comprises the steps of:

(c) processing the forward-error-correction code of the received signal with a Viterbi decoder to compute path metrics affected by the bit-error rate of the received signal and to normalize said computed path metrics, and (d) counting said normalizations over fixed intervals to measure a path metric normalization rate as the measured parameter.

9. A method according to claim 8, wherein step (b) comprises the steps of:

(e) readjusting the apparatus within a given range of settings defined by boundaries on both sides of the initial setting;

(f) extending said given range beyond one of said boundaries when the measured parameter is minimized at said one boundary; and (g) readjusting said apparatus within said extended given range.

10. A method according to claim 8, wherein the apparatus is an antenna; and wherein step (b) comprises the step of realigning the antenna from an initial position in response to said measurement until the measured parameter is minimized.

11. A method according to claim 10, wherein step (b) comprises the steps of:

(e) realigning the antenna within a given range of positions defined by boundaries on both sides of the initial position;

(f) extending said given range beyond one of said boundaries when the measured parameter is minimized at said one boundary; and (g) realigning said antenna within said extended given range.

12. A method according to claim 8, wherein the apparatus is an antenna polarizer; and wherein step (b) comprises the step of realigning the polarizer from an initial position in response to said measurement until the measured parameter is minimized.

13. A method according to claim 12, wherein step (b) comprises the steps of:

(e) realigning the polarizer within a given range of positions defined by boundaries on both sides of the initial position;

(f) extending said given range beyond one of said boundaries when the measured parameter is minimized at said one boundary; and (g) realigning said polarizer within said extended given range.

14. A method according to claim 8, wherein the apparatus is a frequency-tunable receiver; and wherein step (b) comprises the step of retuning the receiver from an initial frequency setting in response to said measurement until the measured parameter is minimized.

15. A method according to claim 14, wherein step (b) comprises the steps of:

(e) retuning the receiver within a given range of frequency settings defined by boundaries on both sides of the initial setting;

(f) extending said given range beyond one of said boundaries when the measured parameter is minimized at said one boundary; and (g) retuning the receiver within said extended given range.

16. A method of automatically adjusting an apparatus for receiving a broadcast communication signal that is forward-error-correction coded, comprising the steps of:

(a) processing a received forward-error-correction-coded signal, when the received signal has been forward error corrected with a convolutional code, to measure a channel-bit-error-rate-affected parameter for the received signal; and (b) adjusting the apparatus from an initial setting in response to said measurement until the measured parameter is minimized;

wherein step (b) comprises the steps of:

(c) readjusting the apparatus within a given range of settings defined by boundaries on both sides of the initial setting;

(d) extending said given range beyond one of said boundaries when the measured parameter is minimized at said one boundary; and (e) readjusting said apparatus within said extended given range.

17. A method according to claim 16, wherein the apparatus is an antenna; and wherein step (b) comprises the step of realigning the antenna from an initial position in response to said measurement until the measured parameter is minimized.

18. A method according to claim 17, wherein step (b) comprises the steps of:

(e) realigning the antenna within a given range of positions defined by boundaries on both sides of the initial position;

(f) extending said given range beyond one of said boundaries when the measured parameter is minimized at said one boundary; and (g) realigning said antenna within said extended given range.

19. A method according to claim 16, wherein the apparatus is an antenna polarizer; and wherein step (b) comprises the step of realigning the polarizer from an initial position in response to said measurement until the measured parameter is minimized.

20. A method according to claim 19, wherein step (b) comprises the steps of:

(e) realigning the polarizer within a given range of positions defined by boundaries on both sides of the initial position;

(f) extending said given range beyond one of said boundaries when the measured parameter is minimized at said one boundary; and (g) realigning said polarizer within said extended given range.

21. A method according to claim 16, wherein the apparatus is a frequency-tunable receiver; and wherein step (b) comprises the step of retuning the receiver from an initial frequency setting in response to said measurement until the measured parameter is minimized.

22. A method according to claim 21, wherein step (b) comprises the steps of:

(e) retuning the receiver within a given range of frequency settings defined by boundaries on both sides of the initial setting;

(f) extending said given range beyond one of said boundaries when the measured parameter is minimized at said one boundary; and (g) retuning the receiver within said extended given range.

23. A method of automatically adjusting a frequency-tunable receiver for receiving a broadcast communication signal that is forward-error-correction coded, comprising the steps of:

(a) processing a received forward-error-correction-coded signal, when the received signal has been forward error corrected with a convolutional code, to measure a channel-bit-error-rate-affected parameter for the received signal; and (b) retuning the receiver from an initial frequency setting in response to said measurement until the measured parameter is minimized.

24. A method according to claim 23, wherein step (b) comprises the steps of:

(e) retuning the receiver within a given range of frequency settings defined by boundaries on both sides of the initial setting;

(f) extending said given range beyond one of said boundaries when the measured parameter is minimized at said one boundary; and (g) retuning the receiver within said extended given range.

* * * * *